(12) United States Patent
Shaeff et al.

(10) Patent No.: US 12,036,831 B2
(45) Date of Patent: Jul. 16, 2024

(54) PIVOTING VEHICLE TRAILER HITCH

(71) Applicant: Ford Global Technologies, LLC, Dearborn, MI (US)

(72) Inventors: Nathan Kenneth Shaeff, West Bloomfield, MI (US); Joe Buchwitz, Huntington Woods, MI (US); James Adam Drozdowski, Chelsea, MI (US); Henry W. Hausler, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 559 days.

(21) Appl. No.: 17/145,771

(22) Filed: Jan. 11, 2021

(65) Prior Publication Data

US 2022/0219500 A1    Jul. 14, 2022

(51) Int. Cl.
*B60D 1/24* (2006.01)
*B60D 1/06* (2006.01)
*B60D 1/44* (2006.01)

(52) U.S. Cl.
CPC ............ *B60D 1/246* (2013.01); *B60D 1/06* (2013.01); *B60D 1/44* (2013.01)

(58) Field of Classification Search
CPC . B60D 1/44; B60D 1/246; B60D 1/54; B60D 2001/542; B60D 2001/544; B60D 1/155
(Continued)

(56) References Cited

U.S. PATENT DOCUMENTS

| 1,235,082 A | * | 7/1917 | Von Brethorst | ......... B60D 1/44 |
| | | | | 280/488 |
| 1,450,526 A | * | 4/1923 | Timmis | ................. B62D 13/00 |
| | | | | 280/470 |

(Continued)

FOREIGN PATENT DOCUMENTS

| DE | 2619912 A | * | 11/1976 | ............... B60D 1/54 |
| DE | 10004522 A1 | * | 8/2001 | ............. B60D 1/246 |

(Continued)

OTHER PUBLICATIONS

DE-10023641-A1 English Translation of Description Retrived from Espacenet Feb. 2023 (Year: 2023).*

(Continued)

*Primary Examiner* — Kevin Hurley
*Assistant Examiner* — Michael R Stabley
(74) *Attorney, Agent, or Firm* — Burr & Forman LLP; Lorne Forsythe

(57) ABSTRACT

A pivotable vehicle trailer hitch assembly may include a tube frame operably coupled to a chassis of a vehicle and extending transversely across a rear portion of the vehicle, a hitch receiver operably coupled to the tube frame to support a ball mount, and a pivot assembly defining a pivot axis substantially perpendicular to a direction of extension of the tube frame. The pivot assembly may be operably coupled to the hitch receiver and the tube frame to pivot the hitch receiver and ball mount about the pivot axis from an extended position in which the hitch receiver and ball mount extend substantially perpendicular to tube frame, and a retracted position in which the hitch receiver and ball mount extend substantially parallel to the tube frame. The pivot assembly comprises an electrically operated linear actuator operable to transfer the hitch receiver and the ball mount between the extended position and the retracted position.

16 Claims, 10 Drawing Sheets

(58) Field of Classification Search
USPC .................................................. 280/491.3
See application file for complete search history.

(56) References Cited

U.S. PATENT DOCUMENTS

| | | | | | |
|---|---|---|---|---|---|
| 2,917,323 | A | * | 12/1959 | Mandekic | ............... B60D 1/44 280/502 |
| 3,178,203 | A | * | 4/1965 | Elliott | ................... B62D 13/00 280/470 |
| 3,666,121 | A | * | 5/1972 | Denner | ................... B60P 1/44 280/491.4 |
| 4,109,930 | A | * | 8/1978 | Pilhall | ..................... B60D 1/54 280/491.4 |
| 4,482,167 | A | * | 11/1984 | Haugrud | ................. B60D 1/54 280/491.3 |
| 4,961,589 | A | * | 10/1990 | Faurenhoff | ............. B60D 1/44 280/475 |
| 4,978,134 | A | * | 12/1990 | Dahl | ....................... B60D 1/54 280/498 |
| 5,429,382 | A | * | 7/1995 | Duncan | .................. B60D 1/167 280/491.4 |
| 6,131,937 | A | * | 10/2000 | Coenen | ............... A01B 59/041 92/75 |
| 6,527,292 | B2 | * | 3/2003 | Adair | ...................... B60D 1/54 280/491.3 |
| 6,908,095 | B2 | * | 6/2005 | Reutlinger | .............. B60D 1/54 280/491.3 |
| 7,338,064 | B1 | * | 3/2008 | Williams | ................. B60D 1/54 280/491.1 |
| 7,669,876 | B2 | * | 3/2010 | Kerpash, Sr. | ........... B60D 1/54 280/479.2 |
| 8,091,913 | B1 | * | 1/2012 | White | ..................... B60D 1/06 280/468 |
| 8,573,628 | B2 | | 11/2013 | McConnell | |
| D737,734 | S | * | 9/2015 | McGinnes | .................. D12/162 |
| 11,491,920 | B2 | * | 11/2022 | Lichter | .................. B60J 5/0437 |
| 2003/0075900 | A1 | * | 4/2003 | Kleb | ........................ B60D 1/54 280/491.3 |
| 2004/0021292 | A1 | * | 2/2004 | Abair | ..................... B60D 1/246 280/456.1 |
| 2010/0148471 | A1 | * | 6/2010 | McConnell | ............. B60D 1/06 280/511 |
| 2017/0240010 | A1 | * | 8/2017 | Tiainen | .................. B60D 1/06 |
| 2019/0322144 | A1 | * | 10/2019 | Shaeff | ...................... B60D 1/52 |
| 2022/0016947 | A1 | * | 1/2022 | Pomish | ................. B60D 1/246 |

FOREIGN PATENT DOCUMENTS

| | | | | |
|---|---|---|---|---|
| DE | 10023641 | A1 * | 11/2001 | ............. B60D 1/06 |
| DE | 10347816 | A1 * | 5/2005 | ............. B60D 1/246 |
| DE | 202016105755 | U1 * | 2/2018 | ............. B60D 1/06 |
| EP | 1153770 | A2 * | 11/2001 | ............. B60D 1/246 |
| EP | 1535765 | A1 * | 6/2005 | ............. B60D 1/06 |
| EP | 1541385 | A1 * | 6/2005 | ............. B60D 1/06 |
| EP | 1561610 | A1 * | 8/2005 | ............. B60D 1/246 |
| EP | 1584500 | A1 * | 10/2005 | ............. B60D 1/06 |
| EP | 1586471 | A1 * | 10/2005 | ............. B60D 1/06 |
| GB | 164958 | A * | 6/1921 | |
| WO | WO-2019033210 | A1 * | 2/2019 | |

OTHER PUBLICATIONS

EP-1541385-A1 English Translation of Description Retrived from Espacenet Feb. 2023 (Year: 2023).*
DE-10347816-A1 English Translation of Description Retrived from Espacenet Feb. 2023 (Year: 2023).*
Youtube Video: Bearded Budget Guy: BMW Trailer Tow Hitch, Fully Electrically Operated. (https://youtu.be/8zBiKMxq7SU).
Youtube Video: OEM Audi Towbar Features in the Luggage Compartment Stability Programme (ESC), Copyright SatNav Systems (UK) Ltd, 2016. (https://youtu.be/nc3dGKGOtKs).

* cited by examiner

PIVOTING VEHICLE TRAILER HITCH

TECHNICAL FIELD

Example embodiments generally relate to vehicle towing capabilities and, more particularly, relate to a pivoting trailer hitch that can be operated to alternately extend and retract a trailer hitch under powered control.

BACKGROUND

Vehicles, and especially (although not exclusively) trucks and sport utility vehicles (SUVs), often have towing capabilities. A popular option with respect to towing, is to provide a receiver inside which a ball hitch can be removably retained. The ball hitch can therefore be placed in the receiver for enabling towing, or the ball hitch can be removed and stored until needed. When removed, some customers enjoy the ability to utilize the receiver for accessories of various kinds, which further add to the popularity of these features.

All that being said, when the ball hitch is provided in the receiver and the vehicle is not currently towing anything, the ball hitch (undesirably for some) sticks out and may either have potential to interact with the ground, or the shin or leg of someone walking by the rear of the vehicle. Still others may consider the extending ball hitch to unsightly. While this could be remedied by removing the ball hitch, such removal is a manual process that requires the operator to leave the vehicle and proceed to the rear to make the corresponding adjustment to remove the ball hitch. Moreover, storage of the ball hitch may create separate issues due to moving around if not rigidly retained in storage on the vehicle, or due to the ball hitch being unavailable when needed in situations where the ball hitch is stored separate from the vehicle. Thus, it may be desirable to develop a solution that addresses some of the shortcomings discussed above.

BRIEF SUMMARY OF SOME EXAMPLES

In accordance with an example embodiment, a pivotable vehicle trailer hitch assembly may be provided. The assembly may include a tube frame operably coupled to a chassis of a vehicle and extending transversely across a rear portion of the vehicle, a hitch receiver operably coupled to the tube frame to support a ball mount, and a pivot assembly defining a pivot axis substantially perpendicular to a direction of extension of the tube frame. The pivot assembly may be operably coupled to the hitch receiver and the tube frame to pivot the hitch receiver and ball mount about the pivot axis from an extended position in which the hitch receiver and ball mount extend substantially perpendicular to tube frame, and a retracted position in which the hitch receiver and ball mount extend substantially parallel to the tube frame. The pivot assembly comprises an electrically operated linear actuator operable to transfer the hitch receiver and the ball mount between the extended position and the retracted position.

In another example embodiment, a hitch control system may be provided. The system may include a pivotable vehicle trailer hitch assembly, and a controller operable to electronically control movement of a hitch receiver of the pivotable vehicle trailer hitch assembly between an extended position and a retracted position. The pivotable vehicle trailer hitch assembly may include a tube frame operably coupled to a chassis of a vehicle and extending transversely across a rear portion of the vehicle, and a pivot assembly defining a pivot axis substantially perpendicular to a direction of extension of the tube frame. The pivot assembly may be operably coupled to the hitch receiver and the tube frame to pivot the hitch receiver and ball mount about the pivot axis from the extended position in which the hitch receiver and the ball mount extend substantially perpendicular to tube frame, and a retracted position in which the hitch receiver and the ball mount extend substantially parallel to the tube frame. The pivot assembly may include an electrically operated linear actuator operable responsive to input from the controller to transfer the hitch receiver and the ball mount between the extended position and the retracted position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
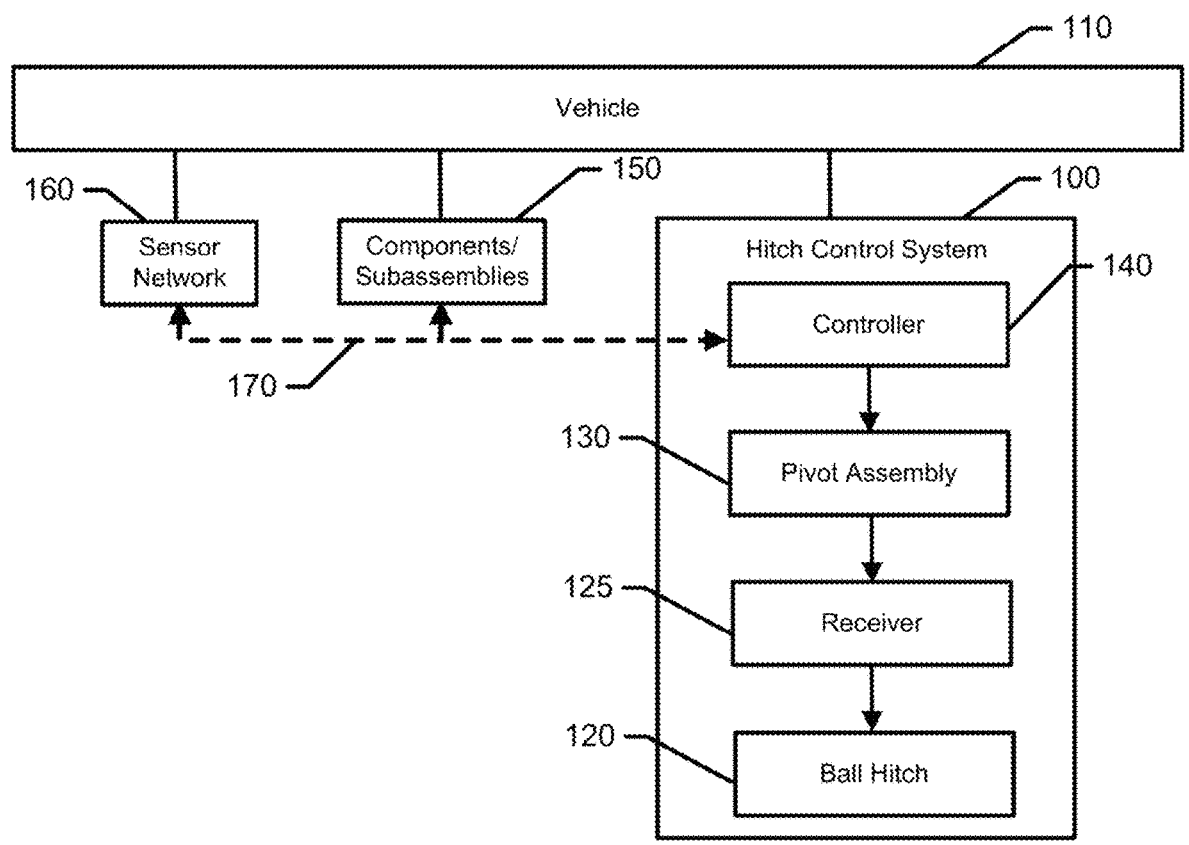
FIG. 1 illustrates a block diagram of a powered hitch control system of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some example embodiments may provide an ability to pivot the ball hitch (while retained in the receiver, and therefore by pivoting the receiver), to alternate between extended and retracted positions. Moreover, example embodiments may enable such functionality with a relatively simple and efficient design that is both highly effective and also relatively inexpensive to construct. As a result, vehicle performance and driver satisfaction may also be improved.

FIG. 1 illustrates a block diagram of a powered hitch control system 100 of an example embodiment. The components of the hitch control system 100 may be incorporated into a vehicle 110 (e.g., via being operably coupled to a chassis of the vehicle 110 and/or electronic control systems of the vehicle 110). Of note, although the components of FIG. 1 may be connected to the chassis of the vehicle 110, it should be appreciated that such connection may be either direct or indirect. Moreover, some of the components of the hitch control system 100 may be connected to the vehicle 110 via intermediate connections to other components either of the chassis or of other systems or components.

The hitch control system 100 may include a ball hitch 120 that may be removably retained in a rotatable receiver 125 (or hitch receiver). The ball hitch 120 may include a ball mount and a ball having any of a number of different ball diameters or standard sizes (e.g., 1⅞ inch, 2 inch and 2 5/16 inch). However, the ball hitch 120 of some embodiments may actually have multiple balls of different sizes, and the orientation of the ball hitch 120 may be changeable to present the desired ball for use in towing. The ball mount and the ball may be made of steel or other rigid and durable material. In some cases, the ball may be attached to the ball mount via a large nut attached to a thread assembly formed at the base of the ball.

In an example embodiment, the receiver 125 may define a metallic sleeve inside which the ball mount of the ball hitch 120 may be releasably retained. In some cases, a retaining pin may extend through the receiver 125 and the ball mount of the ball hitch 120 to affix the ball hitch 120 to the receiver 125. The ball mount may be a substantially solid metallic shaft, and the receiver 125 may extend around all sides of the shaft of the ball mount of the ball hitch 120.

In accordance with an example embodiment, the hitch control system 100 may further include a pivot assembly 130 that enables the ball hitch 120 (and the receiver 125) to be rotated between an extended position and a retracted position. In some cases, the pivot assembly 130 may include multiple components or assemblies that are arranged to define a pivot axis (i.e., a single axis) substantially perpendicular to a direction of extension of a tube frame attached to a chassis of the vehicle 110 (and therefore substantially perpendicular to the ground). The pivot assembly 130 may be operably coupled to the receiver 125 and the tube frame to pivot the receiver 125 and ball hitch 120 about the pivot axis from the extended position to the retracted position. In the extended position, the receiver 125 and the ball hitch 120 may extend substantially perpendicular to tube frame, and in the retracted position, the receiver 125 and the ball hitch 120 may extend substantially parallel to the tube frame.

Specific components that may be used in some cases to embody the pivot assembly 130 will be described in greater detail below. However, in some cases, the pivot assembly 130 may be operable under electronic control from a controller 140 or control module. In some cases, the controller 140 may be part of an electronic control system of the vehicle 110 that is configured to perform other tasks related or not related to hitch control. However, the controller 140 could be a dedicated or standalone controller in some cases.

In an example embodiment, the controller 140 may receive specific instructions from the driver or vehicle operator in relation to pivoting of the ball hitch 120. The instructions may, in some cases, come from a switch or actuator located inside the cab of the vehicle 110 (e.g., at the steering wheel, control console, dashboard display, etc.). However, the switch or actuator could alternatively be located proximate to the pivot assembly 130. The switch or actuator may, for example, be a hard key or a soft key in some cases.

In some cases, the hitch control system 100 (and consequently the components of the pivot assembly 130, the receiver 125 and the ball hitch) may be among various other components or subassemblies 150 of the vehicle 110. In some cases, various sensors that may be operably coupled to the components or subassemblies 150 may be included, and may provide input to the controller 140 that is used in determining a status of the ball hitch 120 (e.g., extended or retracted). Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

Figure 2:
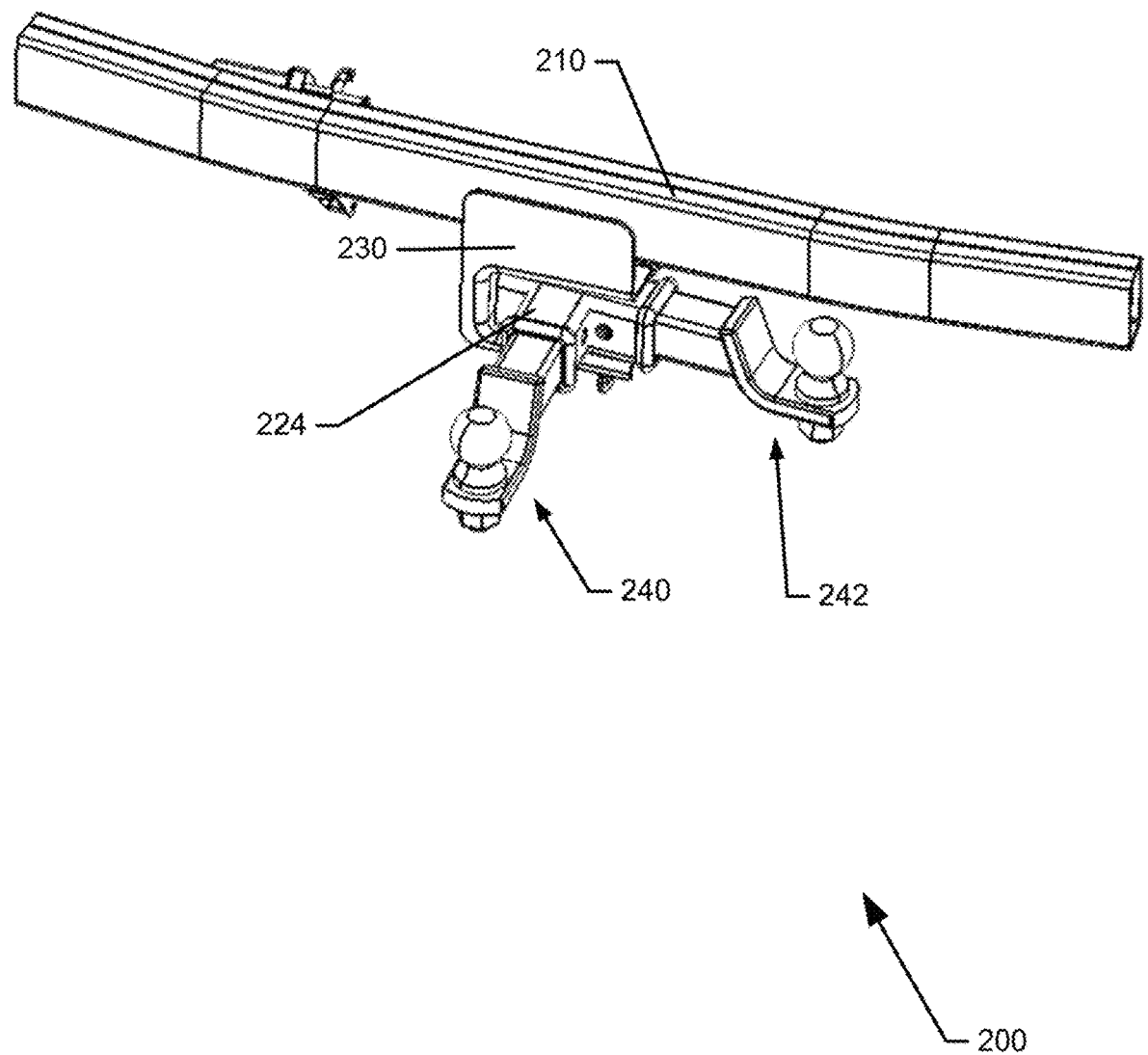
FIG. 2 illustrates a perspective view of a hitch control assembly of an example embodiment in each of an extended position and a retracted position.
Figure 3:
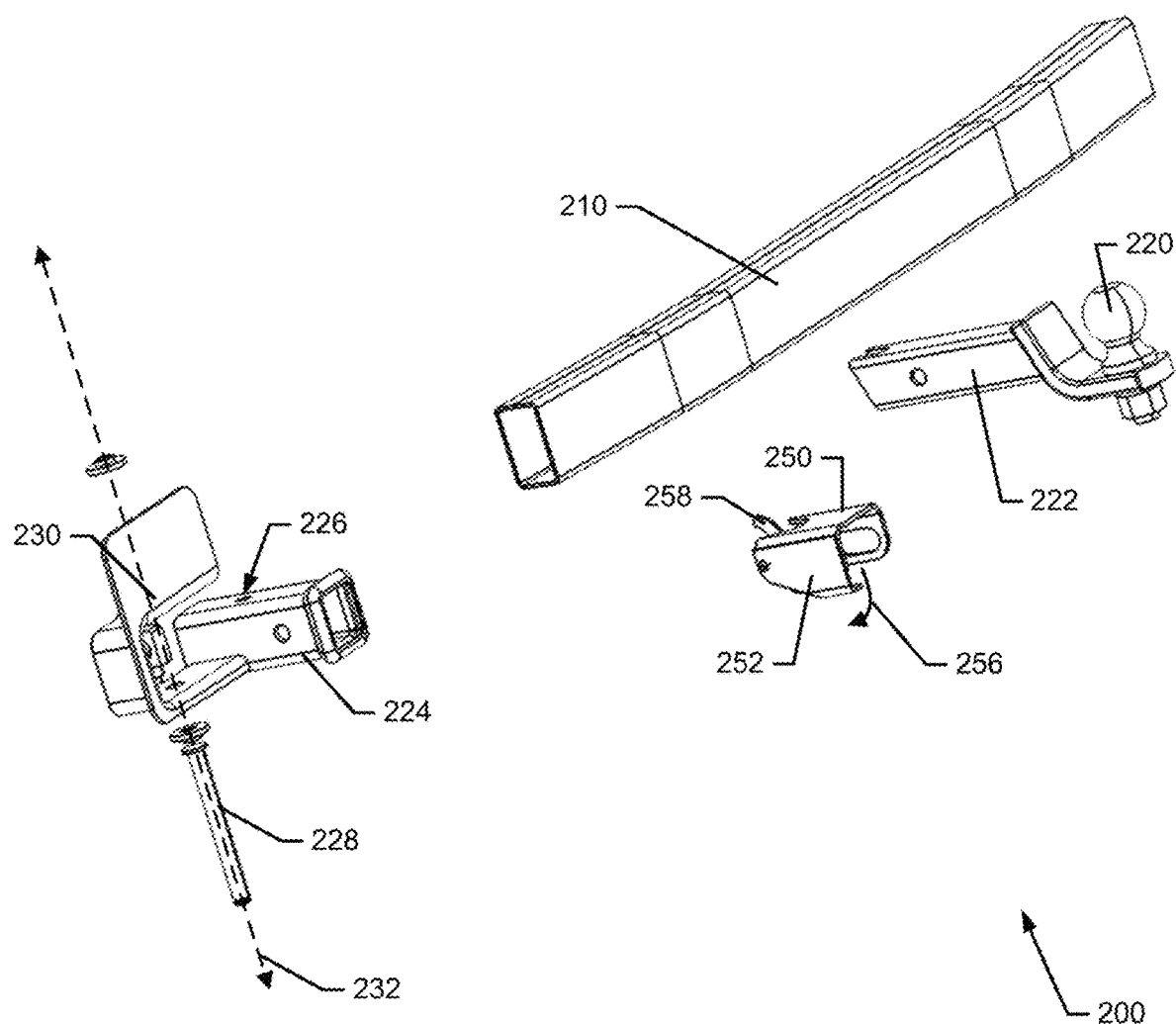
FIG. 3 illustrates an exploded view of the hitch control assembly in accordance with an example embodiment.

FIG. 2 illustrates a perspective view of a hitch control assembly 200 of an example embodiment in each of an extended position and a retracted position, and FIG. 3 illustrates an exploded view of the hitch control assembly 200. In this regard, the hitch control assembly 200 includes a tube frame 210, which may be operably coupled to or may be a portion of a chassis of the vehicle (e.g., vehicle 110 of FIG. 1). The tube frame 210 may generally extend across a rear end of the vehicle and, in some cases, may be located inside a rear bumper or other body structures at the rear end of the vehicle. In some cases, the tube frame 210 may extend in a plane that is substantially parallel to the ground, and the tube frame 210 may extend substantially perpendicular to a longitudinal centerline of the vehicle (and therefore transversely across the rear end of the vehicle).

The ball hitch 120 of FIG. 1 is shown in FIG. 2 as ball 220 and ball mount 222, which are disposable inside receiver 224. The receiver 224 is pivotable inside pivot bracket 230, which is rigidly mounted to the tube frame 210. The pivot bracket 230 may be a substantially C-shaped bracket that is mounted beneath the tube frame 210. The receiver 224 may include a receiving hole 226, which may receive pivot pin 228. The pivot pin 228 may also pass through the pivot bracket 230 (and sometimes also through the tube frame 210) to define an axis 232 about which the receiver 224 pivots while carrying the ball 220 and ball mount 222 between an extended position 240 and a retracted position 242 shown in FIG. 2. The axis 232 is substantially perpendicular to the ground and to the direction of extension of the tube frame 210.

Figure 4A:
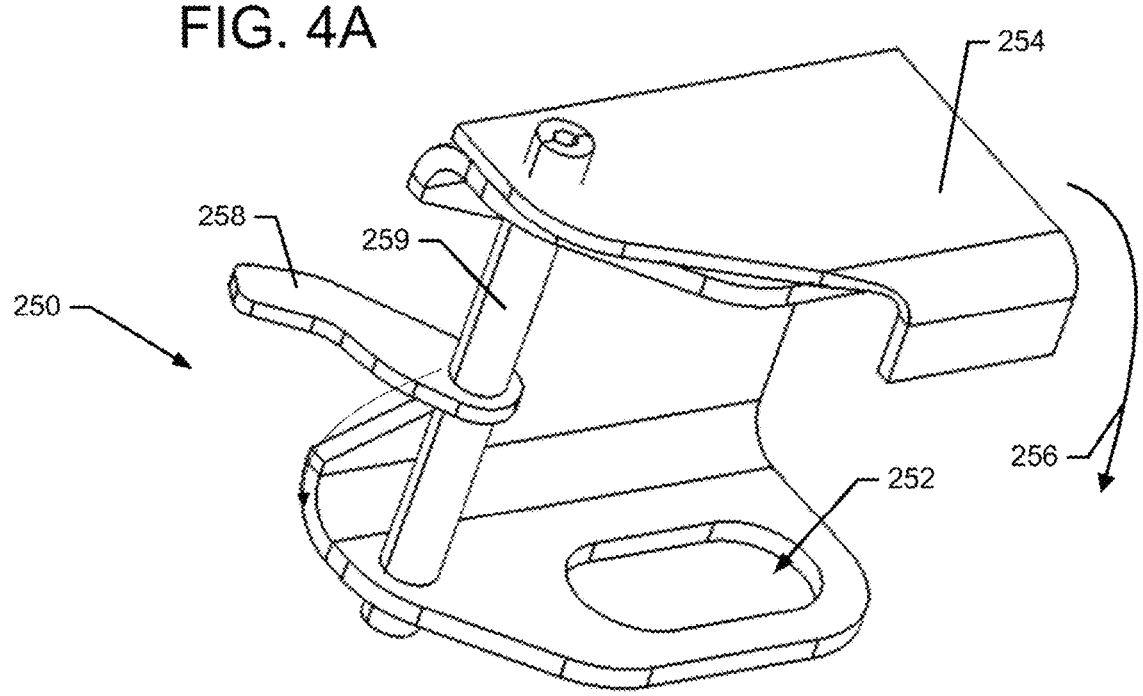
FIG. 4A illustrates a perspective of a locking chain bracket in accordance with an example embodiment.
Figure 4B:
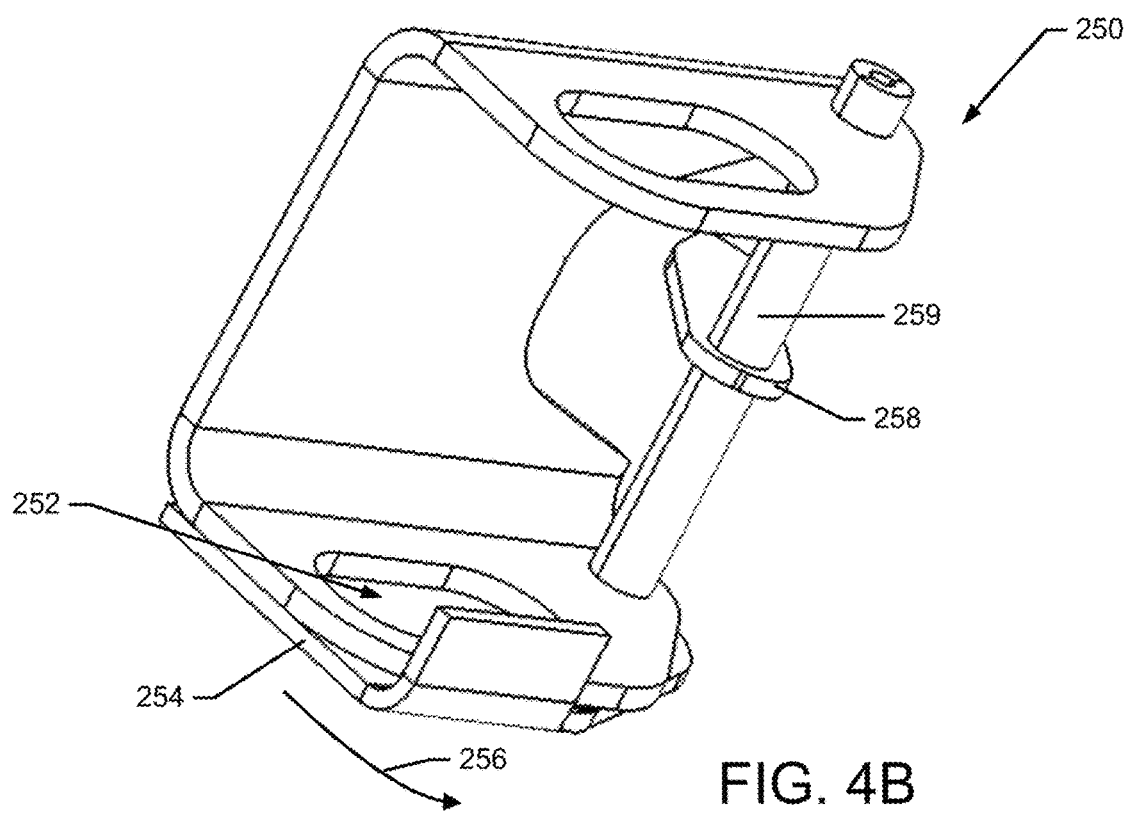
FIG. 4B illustrates another perspective of the locking chain bracket in accordance with an example embodiment.
Figure 4C:
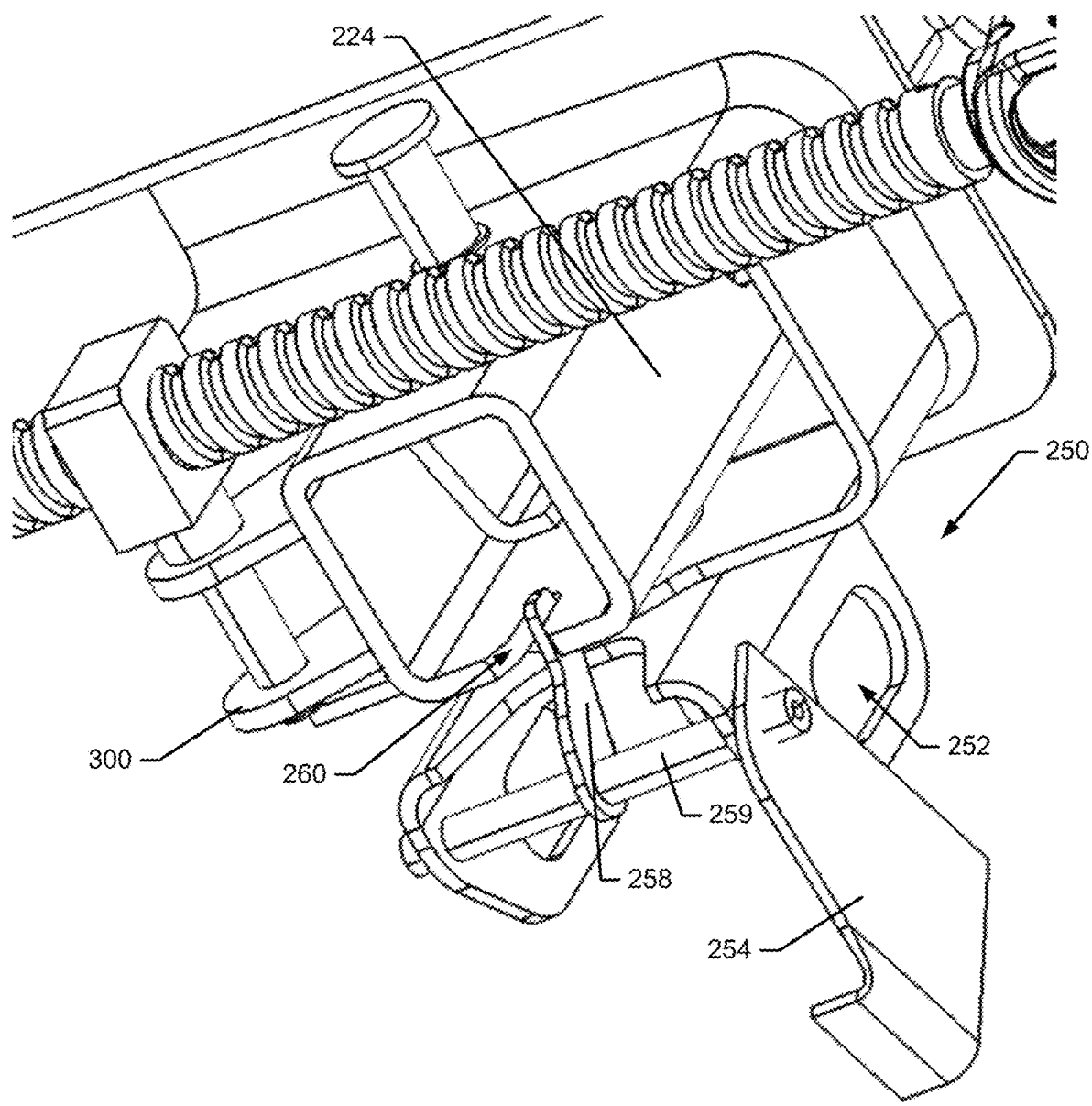
FIG. 4C illustrates the locking chain bracket with a guard rotated to expose orifices therein for receipt of locking chains in accordance with an example embodiment.

The hitch control assembly 200 may also include a locking chain bracket 250, which may be connected to an underside of the pivot bracket 230, and which is shown in detail in FIGS. 4A, 4B and 4C. The locking chain bracket 250 may receive the locking chains, or locking hooks, which may be employed in connection with towing, within orifices 252 defined in the locking chain bracket 250. However, the locking chain bracket 250 may also have a guard member 254, that moves in a direction shown by arrow 256 of FIG. 4A to provide access to the orifices 252 of the locking chain bracket 250 or moves in the direction opposite arrow 256 to the position shown in FIG. 3 in order to block access to the orifices 252 of the locking chain bracket 250.

In some cases, a lever arm 258 may be attached to the guard member 252 to pivot when a shaft 259 common to both the lever arm 258 and the guard member 252 is actuated. The lever arm 258 may be not be capable of rotation to the position shown in FIGS. 3, 4A and 4B except when the ball mount 222 is pivoted to the extended position 240. In this regard, the receiver 224 may include a receiving slot 260 that is visible in the perspective view of the receiver 224 shown in FIGS. 4C and 5. The slot 260 is aligned with the lever arm 258 only when the receiver 224 is pivoted to the extended position 240. When this alignment is achieved, the lever arm 258 may be pivoted into the slot 260 as shown in FIG. 4C in order to add additional security and robustness (i.e., an additional locking feature) to the structures associated with ensuring the locking chains are able to be put in place when towing. In any other position (i.e., in the retracted position 242, and any transition position between the retracted position 242 and the extended position 240), the lever arm 258 is blocked from moving into the slot 260, and thereby cannot provide movement of the guard member 254 in the direction of arrow 256 to expose the orifices 252. The guard member 254 and the lever arm 258 may be positioned manually by the operator in some cases.

Figure 5:
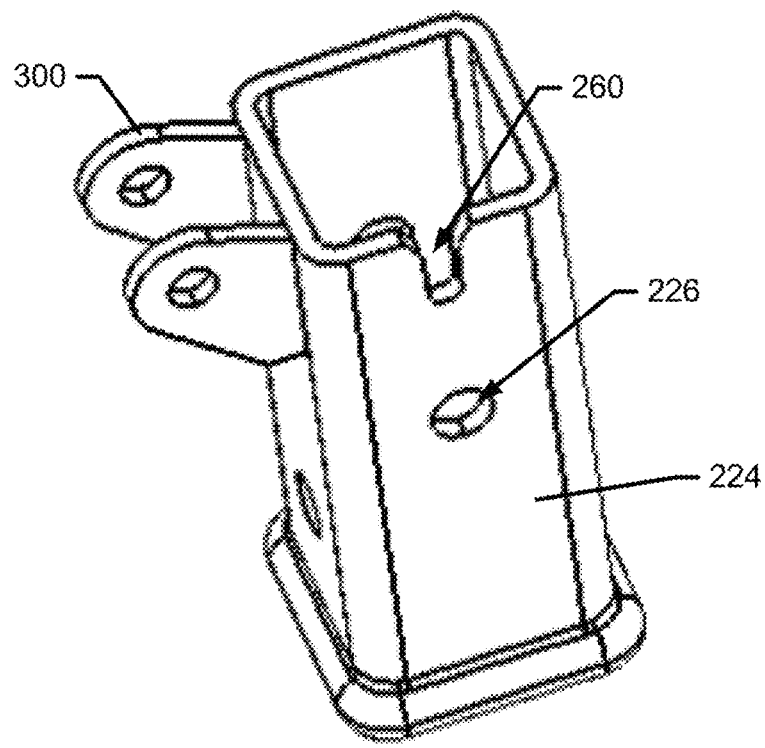
FIG. 5 is a perspective view of a receiver in isolation in accordance with an example embodiment.

In an example embodiment, the pivot assembly 130 of FIG. 1 may include an electric motor 300 and a linear actuator 310 that are operably coupled to each other and to the receiver 224 to pivot the receiver 224 (and thereby also pivot the ball mount 222). As shown in FIG. 5, the receiver 224 may include a clevis 320 attached to a rear portion thereof. The clevis 320 may be operably coupled to a lead screw 312 of the linear actuator 310 via a carrier pin 314 that rides on the lead screw 312 in threaded engagement therewith. The interaction between the lead screw 312, the carrier pin 314 and the clevis 320 is shown in FIGS. 6A, 6B, 7A, 7B and 8. In this regard, responsive to rotation of the lead screw 312, the carrier pin 314 moves along the lead screw 312 to carry the clevis 320 with the carrier pin 314 and thereby rotate the receiver 224 about the axis 232 defined by the pivot pin 228.

The lead screw 312 may generally extend in a transverse direction (e.g., parallel to a direction of extension of the tube frame 210 and perpendicular to a longitudinal centerline of the vehicle). However, while the clevis 320 is carried by the carrier pin 314, the arc of rotation of the clevis 320 when the receiver 224 pivots about the axis 232 may require the lead screw 312 to move slightly out of parallel with the tube frame 210. To accommodate such motion, the lead screw 312 may be operably coupled to the electric motor 300 via a universal joint 330. The universal joint 330 may enable the lead screw 312 to rotate even while the lead screw 312 is flexed or moved in a direction out of parallel with the tube frame 210 (shown by arrow 322) to allow for the full range of motion of the clevis 320 from the extended position 240 to the retracted position 242.

Figure 6A:
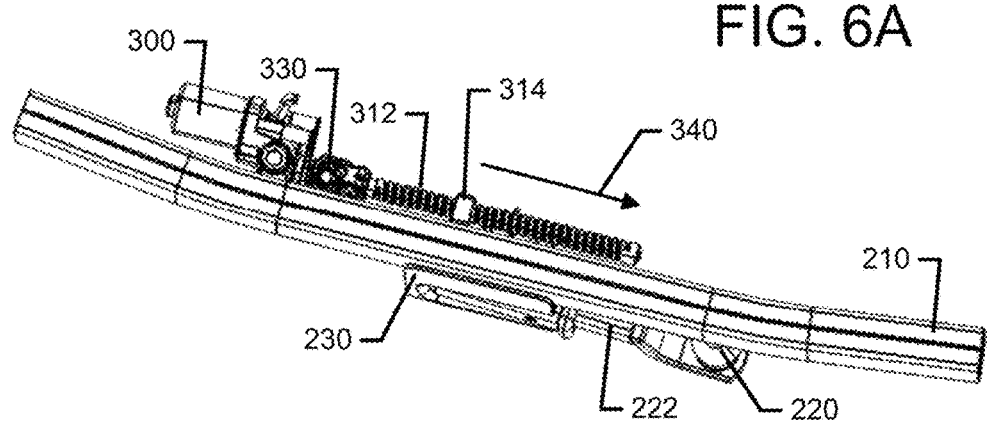
FIGS. 6A and 6B show top perspective views of the electric motor and linear actuator in a retracted position in accordance with an example embodiment.
Figure 6B:
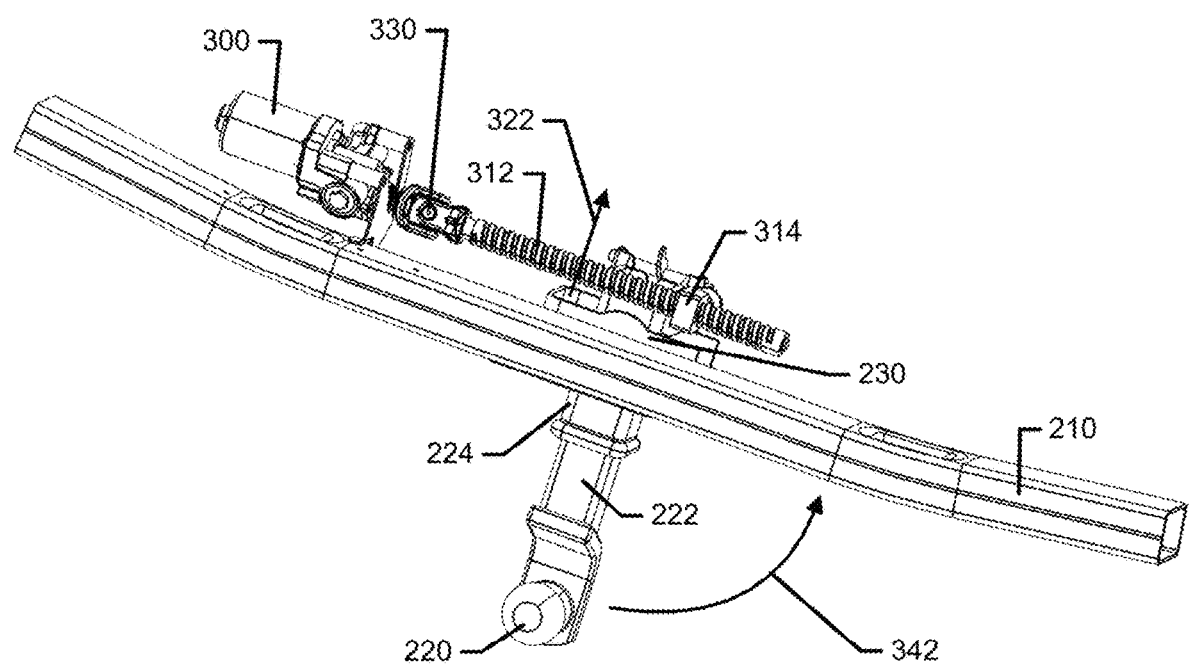
Figure 7A:
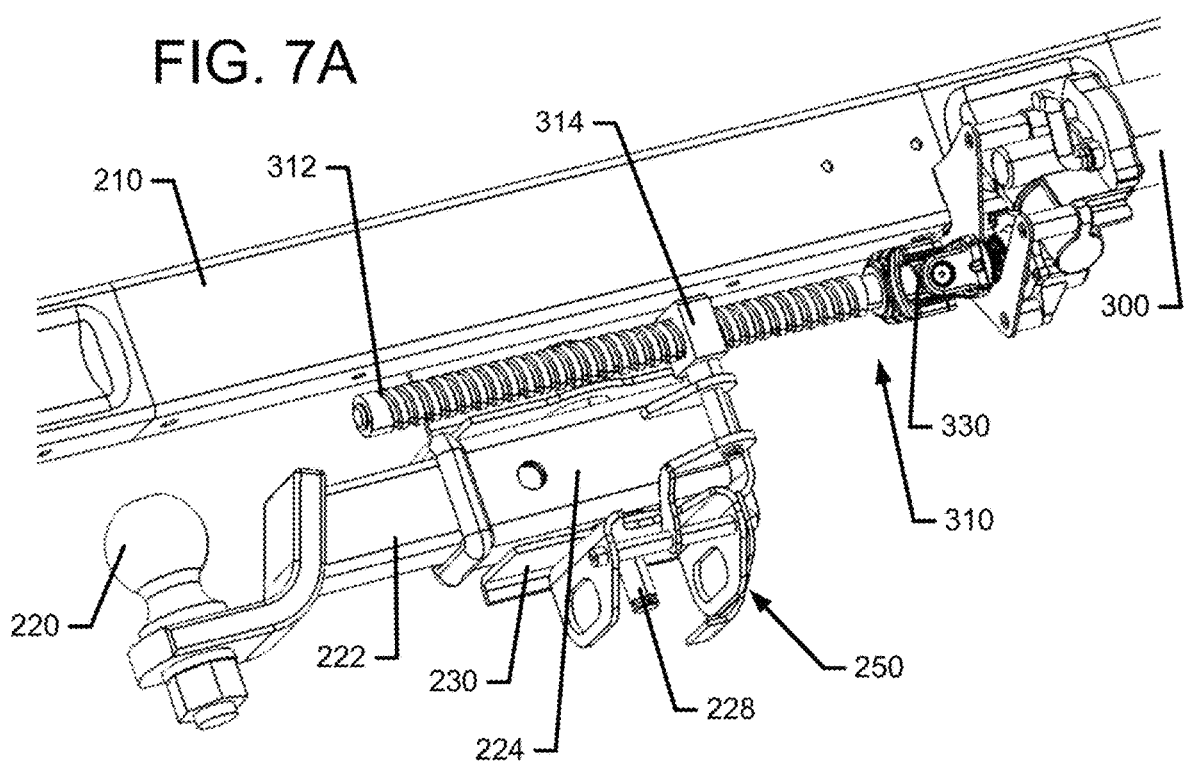
FIGS. 7A and 7B show top perspective views of the electric motor and linear actuator in an extended position in accordance with an example embodiment.
Figure 7B:
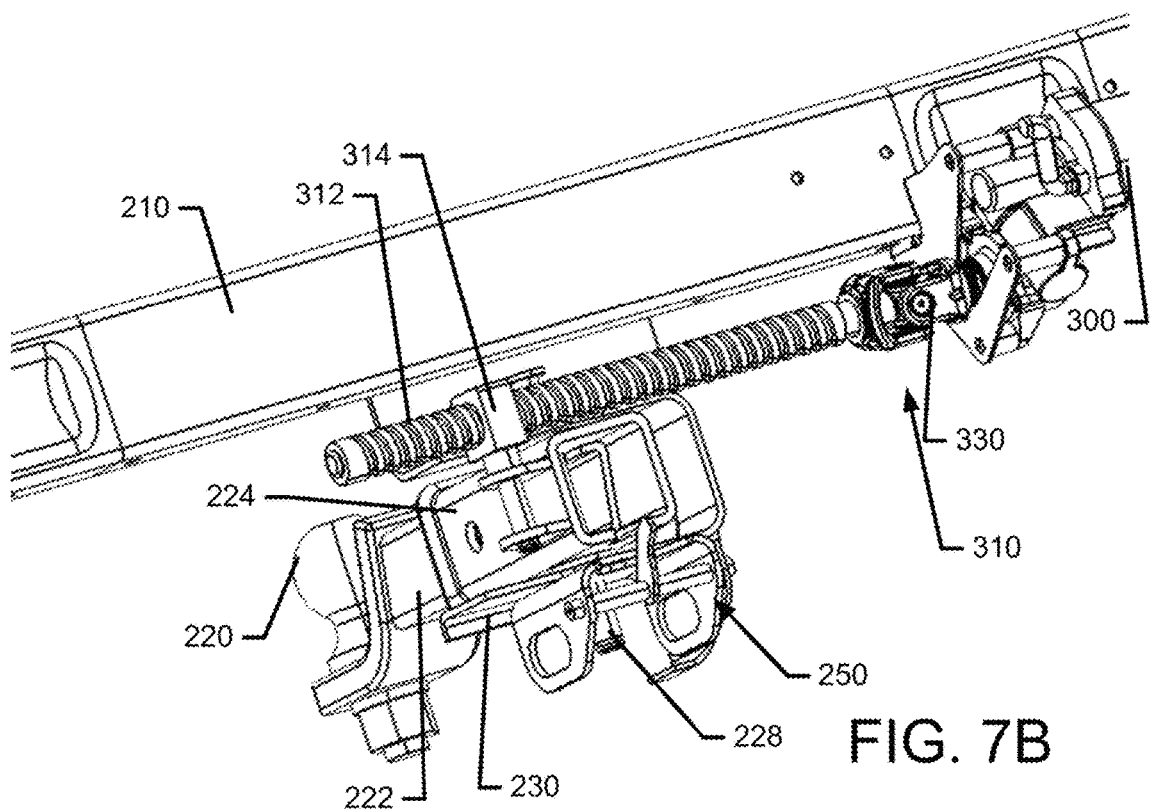
Figure 8:
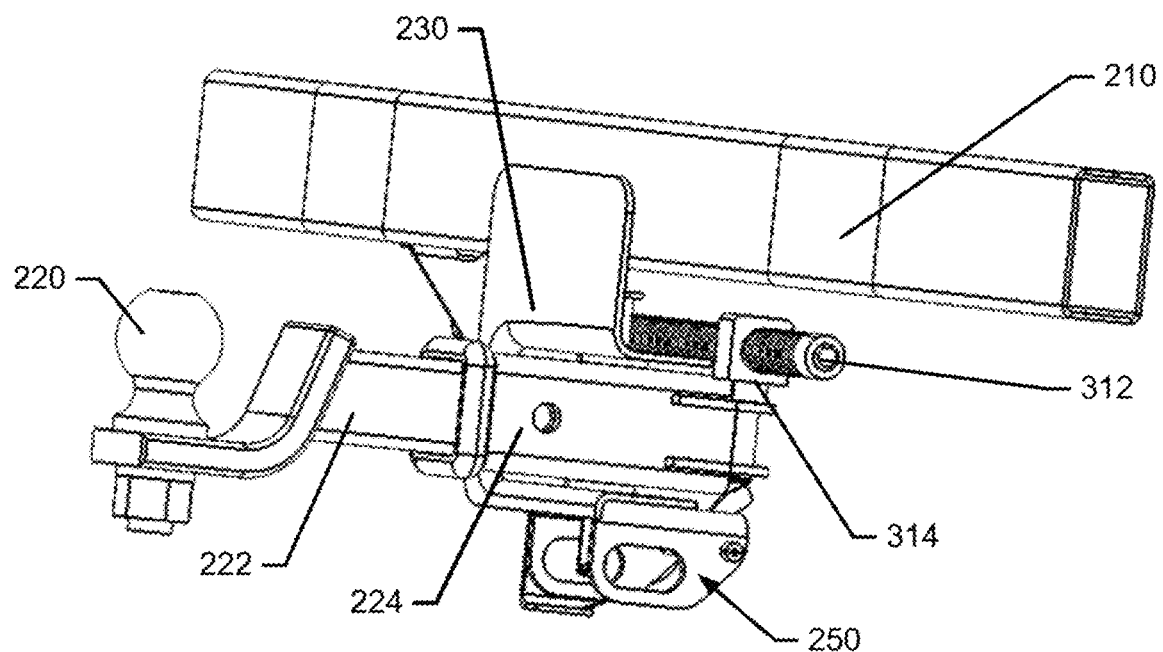
FIG. 8 shows a side perspective view of the electric motor and linear actuator in an extended position in accordance with an example embodiment.

FIGS. 6A and 6B show top perspective views of the electric motor 300 and linear actuator 310, and FIGS. 7A and 7B show rear perspective views of the electric motor 300 and linear actuator 310. The receiver 224 is in the extended position in FIGS. 6B and 7B, and is in the retracted position in FIGS. 6A and 7A. FIG. 8 shows a side perspective view of the receiver in the extended position. As shown in FIGS. 6A and 7A, the carrier pin 314 is at a position along the lead screw 312 that is closest to the electric motor 300 in the retracted position. Then, as the lead screw 312 is turned to move the carrier pin 314 in a direction of arrow 340, the carrier pin 314 carries the clevis 320 through an arc of rotation while the receiver 224 pivots about the axis 232. The carrier pin 314 continues to move in the direction of arrow 340 until the position of the carrier pin 314 shown in FIGS. 6B, 7B and 8 is reached, at which point the receiver 224 has been fully rotated to the extended position. The carrier pin 314 is farthest away from the electric motor 300 when the receiver 224 is in the extended position.

Rotation of the lead screw 312 by the electric motor 300 in the opposite direction will draw the carrier pin 314 back toward the electric motor 300. As such, movement of the carrier pin 314 is in a direction opposite that shown by arrow 340. The carrier pin 314 carries the clevis 320 through an arc of rotation while the receiver 224 pivots about the axis 232 in a direction of arrow 342. The carrier pin 314 continues to move opposite the direction of arrow 340 until the position of the carrier pin 314 shown in FIGS. 6A and 7A is reached, at which point the receiver 224 has been fully rotated to the retracted position. The carrier pin 314 is, again, closest to the electric motor 300 when the receiver 224 is in the retracted position. In both cases (i.e., moving from the extended position to the retracted position and vice versa), flexion of the lead screw 312 in the direction of arrow 340 is allowed by the universal joint 330.

Figure 9A:
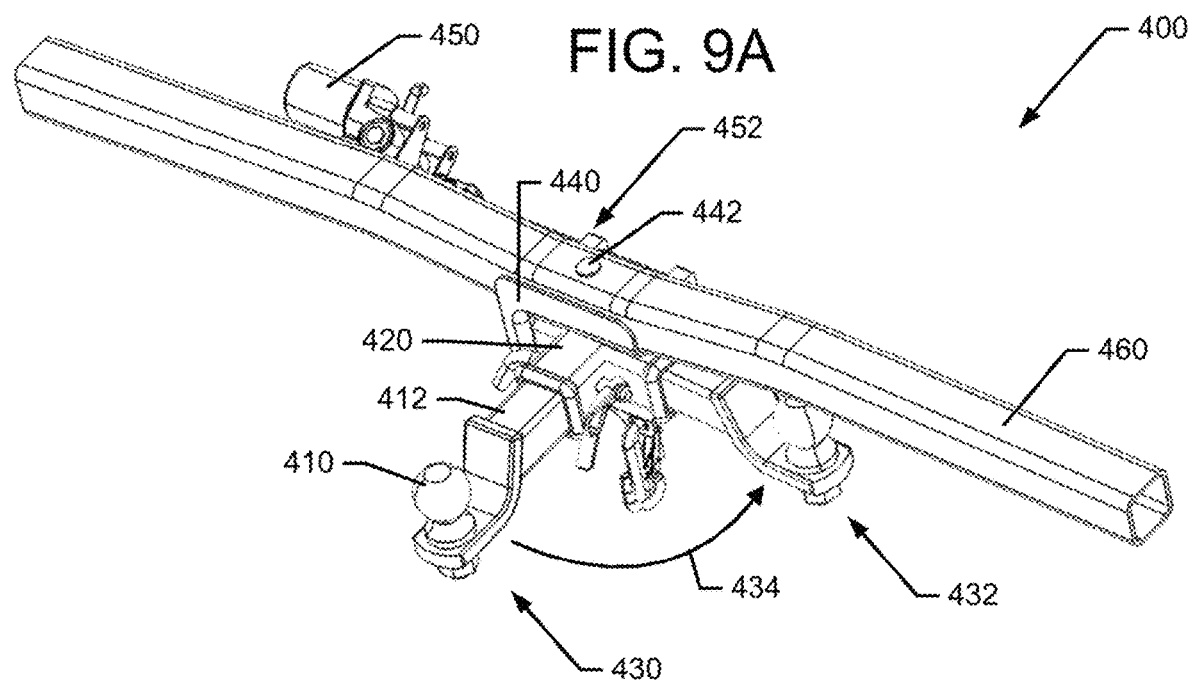
FIG. 9A is a top perspective view of an alternative structure for a hitch control assembly showing both extended and retracted position in accordance with an example embodiment.
Figure 9B:
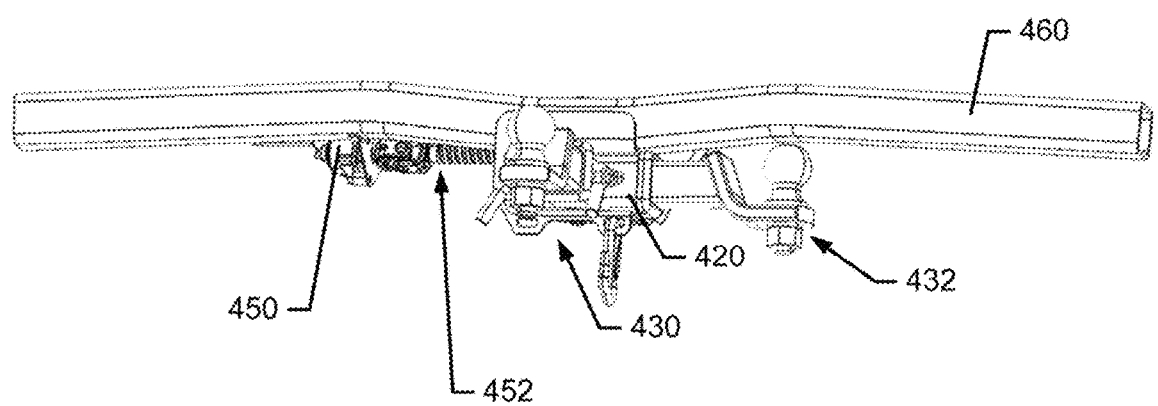
FIG. 9B is a front perspective view of the hitch control assembly in accordance with an example embodiment.

As noted above, the structures of FIGS. 2-8 are illustrative of one example embodiment, and other alternative structures may be used in some cases in order to instantiate the hitch control assembly 200. FIGS. 9A and 9B illustrate one such alternative structure in the form of hitch control assembly 400. FIG. 9A is a top perspective view of the hitch control assembly 400 and FIG. 9B is a front perspective view of the hitch control assembly 400. The hitch control assembly 400 of FIG. 9 is similar to the hitch control assembly 200 of FIGS. 2-8 with a few exceptions in which alternative structures are employed. In this regard, FIGS. 9A and 9B show a ball 410, ball mount 412 and receiver 420 that may be identical to the corresponding components of FIGS. 2-8. The receiver 420 may also be pivoted between an extended position 430 and a retracted position 432 by pivoting of the receiver 420 within pivot bracket 440 in the direction of arrow 434 about pivot pin 442. In FIGS. 9A and 9B, both the extended position 430 and retracted position 432 are shown at the same time. However, it should be appreciated that the hitch control assembly 400 is only capable of being in one of the extended position 430 or the retracted position 432 at any given time.

Similar to the examples above, electric motor 450 may drive a linear actuator 452 to cause the rotation of the receiver 420. However, one difference relative to the example of FIGS. 2-8 is that tube frame 460 does not lie in a same plane parallel to the ground. Instead, tube frame 460 has a W-shape and the ball 410 fits under one of the apexes of the W-shape of the tube frame 460. A locking chain bracket 470, which is attached to the bottom of the pivot bracket 440 is also different in structure than the locking chain bracket 250 of the prior example. Otherwise, operation of the hitch control assembly 400 of FIGS. 9A and 9B is similar to that described above. In this regard, the motor 450 operates the linear actuator 452 to rotate the receiver 420 about the pivot pin 442 within the pivot bracket 440 to transfer between the extended position 430 and the retracted position 432.

A pivotable vehicle trailer hitch assembly may therefore be provided. The assembly may include a tube frame operably coupled to a chassis of a vehicle and extending transversely across a rear portion of the vehicle, a hitch receiver operably coupled to the tube frame to support a ball mount, and a pivot assembly defining a pivot axis substantially perpendicular to a direction of extension of the tube frame. The pivot assembly may be operably coupled to the hitch receiver and the tube frame to pivot the hitch receiver and ball mount about the pivot axis from an extended position in which the hitch receiver and ball mount extend substantially perpendicular to tube frame, and a retracted position in which the hitch receiver and ball mount extend substantially parallel to the tube frame. The pivot assembly comprises an electrically operated linear actuator operable to transfer the hitch receiver and the ball mount between the extended position and the retracted position.

The assembly of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the linear actuator may include a lead screw and a carrier pin in threaded engagement with the lead screw, and rotation of the lead screw may move the carrier pin to carry the hitch receiver through movement between the extended position and the retracted position. In some cases, the linear actuator may include a universal joint operably coupling a first end of the lead screw to the motor to enable a second end of the lead screw to flex away from the tube frame as the carrier pin moves along the lead screw to carry the hitch receiver between the extended position and the retracted position. In an example embodiment, the hitch receiver may be operably coupled to a pivot bracket via pivot pin defining the pivot axis, and the pivot bracket may be disposed below the tube frame. In some cases, locking chain bracket is operably coupled to a bottom of the pivot bracket. The locking chain bracket may include orifices to which a locking chain is attachable. At least one of the orifices may be blocked by a guard member when the guard member is disposed in a lock disabling position and unblocked when the guard member is disposed in a lock enabling position. In an example embodiment, the guard member may be operably coupled to a shaft to which a lever arm is also operably coupled, and the lever arm may only be enabled to rotate such that the guard member is moved to the lock enabling position when the hitch receiver is in the extended position. In some cases, the hitch receiver may include a receiving slot disposed at a distal end thereof relative to the ball mount, and the lever arm may be rotatable into the receiving slot only when the hitch receiver is in the extended position. In an example embodiment, the hitch receiver may releasably retain the ball mount in the hitch receiver via a retaining pin that extends in a direction substantially perpendicular to the pivot axis. In some cases, the hitch receiver stays in a first plane substantially parallel to the ground during the transition or transfer between the extended position and the retracted position. In an example embodiment, the tube frame may extend substantially in a second plane parallel to the first plane and the ground. Alternatively, the tube frame may includes a portion that extends out of a second plane parallel to the first plane and the ground, and a ball attached to the ball mount may fit under the portion that extends out of the second plane when the hitch receiver is rotated to the retracted position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A pivotable vehicle trailer hitch assembly comprising:
    a tube frame operably coupled to a chassis of a vehicle and extending transversely across a rear portion of the vehicle;
    a hitch receiver operably coupled to the tube frame to support a ball mount; and
    a pivot assembly defining a pivot axis substantially perpendicular to a direction of extension of the tube frame, the pivot assembly being operably coupled to the hitch receiver and the tube frame to pivot the hitch receiver and ball mount about the pivot axis from an extended position in which the hitch receiver and ball mount extend substantially perpendicular to tube frame, and a retracted position in which the hitch receiver and ball mount extend substantially parallel to the tube frame,
    wherein the pivot assembly comprises an electrically operated linear actuator operable to transfer the hitch receiver and the ball mount between the extended position and the retracted position,
    wherein the linear actuator comprises a lead screw and a carrier pin in threaded engagement with the lead screw,
    wherein rotation of the lead screw moves the carrier pin to carry the hitch receiver through movement between the extended position and the retracted position,
    wherein the linear actuator comprises a universal joint operably coupling a first end of the lead screw to the motor to enable a second end of the lead screw to flex away from the tube frame as the carrier pin moves along the lead screw to carry the hitch receiver between the extended position and the retracted position, and
    wherein a distance between the lead screw and the hitch receiver increases as the lead screw flexes away from the tube frame.

2. The assembly of claim 1, wherein the hitch receiver is operably coupled to a pivot bracket via pivot pin defining the pivot axis, and
wherein the pivot bracket is disposed below the tube frame.

3. The assembly of claim 1, wherein the hitch receiver releasably retains the ball mount in the hitch receiver via a retaining pin that extends in a direction substantially perpendicular to the pivot axis.

4. The assembly of claim 1, wherein the hitch receiver stays in a first plane substantially parallel to the ground during transition between the extended position and the retracted position.

5. The assembly of claim 4, wherein the tube frame extends substantially in a second plane parallel to the first plane and the ground.

6. The assembly of claim 4, wherein the tube frame includes a portion that extends out of a second plane parallel to the first plane and the ground, and
wherein a ball attached to the ball mount fits under the portion that extends out of the second plane when the hitch receiver is rotated to the retracted position.

7. A pivotable vehicle trailer hitch assembly comprising:
a tube frame operably coupled to a chassis of a vehicle and extending transversely across a rear portion of the vehicle;
a hitch receiver operably coupled to the tube frame to support a ball mount; and
a pivot assembly defining a pivot axis substantially perpendicular to a direction of extension of the tube frame, the pivot assembly being operably coupled to the hitch receiver and the tube frame to pivot the hitch receiver and ball mount about the pivot axis from an extended position in which the hitch receiver and ball mount extend substantially perpendicular to tube frame, and a retracted position in which the hitch receiver and ball mount extend substantially parallel to the tube frame,
wherein the pivot assembly comprises an electrically operated linear actuator operable to transfer the hitch receiver and the ball mount between the extended position and the retracted position,
wherein the hitch receiver is operably coupled to a pivot bracket via pivot pin defining the pivot axis,
wherein the pivot bracket is disposed below the tube frame,
wherein a locking chain bracket is operably coupled to a bottom of the pivot bracket,
wherein the locking chain bracket includes orifices to which a locking chain is attachable, and
wherein at least one of the orifices is blocked by a guard member when the guard member is disposed in a lock disabling position and unblocked when the guard member is disposed in a lock enabling position.

8. The assembly of claim 7, wherein the guard member is operably coupled to a shaft to which a lever arm is also operably coupled, and
wherein the lever arm is only enabled to rotate such that the guard member is moved to the lock enabling position when the hitch receiver is in the extended position.

9. The assembly of claim 8, wherein the hitch receiver comprises a receiving slot disposed at a distal end thereof relative to the ball mount, and
wherein the lever arm is rotatable into the receiving slot only when the hitch receiver is in the extended position.

10. A hitch control system comprising:
a pivotable vehicle trailer hitch assembly; and
a controller operable to electronically control movement of a hitch receiver of the pivotable vehicle trailer hitch assembly between an extended position and a retracted position,
wherein the pivotable vehicle trailer hitch assembly comprises:
a tube frame operably coupled to a chassis of a vehicle and extending transversely across a rear portion of the vehicle; and
a pivot assembly defining a pivot axis substantially perpendicular to a direction of extension of the tube frame, the pivot assembly being operably coupled to the hitch receiver and the tube frame to pivot the hitch receiver and ball mount about the pivot axis from the extended position in which the hitch receiver and the ball mount extend substantially perpendicular to tube frame, and a retracted position in which the hitch receiver and the ball mount extend substantially parallel to the tube frame,
wherein the pivot assembly comprises an electrically operated linear actuator operable responsive to input from the controller to transfer the hitch receiver and the ball mount between the extended position and the retracted position,
wherein the linear actuator comprises a lead screw and a carrier pin in threaded engagement with the lead screw,
wherein rotation of the lead screw moves the carrier pin to carry the hitch receiver through movement between the extended position and the retracted position,
wherein the linear actuator comprises a universal joint operably coupling a first end of the lead screw to the motor to enable a second end of the lead screw to flex away from the tube frame as the carrier pin moves along the lead screw to carry the hitch receiver between the extended position and the retracted position, and
wherein a distance between the lead screw and the hitch receiver increases as the lead screw flexes away from the tube frame.

11. The system of claim 10, wherein the controller provides an instruction to activate the electrically operated linear actuator responsive to operation of a switch or actuator located inside a cab of the vehicle.

12. The system of claim 10, wherein the controller provides an instruction to activate the electrically operated linear actuator responsive to operation of a switch or actuator located proximate to the rear portion of the vehicle.

13. The system of claim 10, wherein the hitch receiver is operably coupled to a pivot bracket via pivot pin defining the pivot axis, and
wherein the pivot bracket is disposed below the tube frame.

14. The system of claim 13, wherein a locking chain bracket is operably coupled to a bottom of the pivot bracket,
wherein the locking chain bracket includes orifices to which a locking chain is attachable, and
wherein at least one of the orifices is blocked by a guard member when the guard member is disposed in a lock disabling position and unblocked when the guard member is disposed in a lock enabling position.

15. The system of claim 14, wherein the guard member is operably coupled to a shaft to which a lever arm is also operably coupled, and
wherein the lever arm is only enabled to rotate such that the guard member is moved to the lock enabling position when the hitch receiver is in the extended position.

16. The system of claim 10, wherein the hitch receiver stays in a first plane substantially parallel to the ground during transition between the extended position and the retracted position.

* * * * *